United States Patent [19]

Hagen et al.

[11] Patent Number: 4,542,377
[45] Date of Patent: Sep. 17, 1985

[54] ROTATABLE DISPLAY WORK STATION

[75] Inventors: Mark D. Hagen, Rochester, Minn.;
Peter J. Mendel, Lexington, Ky.;
John L. Regehr, Stewartville, Minn.

[73] Assignee: International Business Machines Corporation, Armonk, N.Y.

[21] Appl. No.: 453,019

[22] Filed: Dec. 27, 1982

[51] Int. Cl.$^4$ .............................................. G09G 1/00
[52] U.S. Cl. ................................. 340/727; 358/254
[58] Field of Search ............... 340/727, 723, 750, 749, 340/748, 744, 726; 358/254

[56] References Cited

U.S. PATENT DOCUMENTS

| | | | |
|---|---|---|---|
| 3,676,850 | 7/1972 | Goldman et al. | 340/727 |
| 4,167,757 | 9/1979 | Kono et al. | 358/254 |
| 4,267,555 | 5/1981 | Boyd et al. | 340/727 |

OTHER PUBLICATIONS

IBM Technical Disclosure Bulletin vol. 18, No. 11, Apr. 1976, p. 3548, entitled "Cathode-Ray Tube Rotating Apparatus".
Electronic Design, May 27, 1982, p. 239, entitled "Work Station Sports Full Page Screen With Graphics".
Motorola, Inc. Display Module M4408-540 Users Guide dated Mar. 1979, publication No. 68P25253A66.

Primary Examiner—Marshall M. Curtis
Attorney, Agent, or Firm—Laurence R. Letson

[57] ABSTRACT

A CRT display having a rotatable display face for presenting data in a vertical and horizontal orientation is disclosed. The reorientation of the CRT face causes activation of the switches that control the electronic logic to reorient the data and present the data properly on the face of the CRT.

5 Claims, 8 Drawing Figures

ROTATABLE DISPLAY WORK STATION

BACKGROUND OF THE INVENTION

Data processing and word processing terminals typically have displays which differ in desired format. Data processing displays display information in a generally horizontal format of 132 characters wide by approximately 50 lines high while correspondence displays or word processing displays utilize a vertical format of 80 characters wide by 66 lines high.

In some cases the display is capable of having a display pattern on the face of the CRT in either a horizontal or a vertical format but the display configuration is fixed either by a wiring or by substitution of electronic controls. This allows a user to chose the orientation he desires most and then to set up or to configure the display in that orientation or have it configured by the manufacturer. In some cases the displays are rotatable and provide for an altering of the format such that the entire display format is available for the face of the CRT but the dimensions of the characters are altered to permit complete display. For example, the width dimension of a character may be compressed to allow the display of 132 characters even though the CRT is oriented with its short dimension in the horizontal direction.

In this manner the displays are positionable to present a different orientation but they do not provide the uniformity of character appearance normally associated with the display.

The compression of the characters thus forces the entire refresh memory contents into conformity with the dimensional requirements of the CRT face.

SUMMARY OF THE INVENTION

The display of data on the CRT face is accomplished in either a vertical or horizontal CRT position or mode. The refreshing of the characters on the face of the CRT is altered according to the CRT orientation. A two-part character generator or alternatively two separate character generators may be used to create the dot pattern for the face of the CRT to be used in painting the characters from the top left corner of the character and from the top left corner of the CRT face in the horizontal mode and from the lower left corner of the character and the lower left corner of the CRT face in the vertical mode.

The individual character generators are well known in the art and may be combined to form the composite selectably controlled character generator.

In order to use the CRT to its fullest capabilities, requires storage positions corresponding to a matrix 132 characters wide by 80 rows high be available. This will accommodate the maximum dimensions of the display CRT.

Inasmuch as the refresh memory having storage positions 132 characters wide, will exceed the display capability in the vertical format by approximately 52 characters in width, it will be necessary to scroll the display and thus shift access to the refresh memory horizontally in order to be able to view that portion of a 132 character line which extends to the right of the eightieth character position. Likewise it will be necessary to scroll the display vertically when the CRT is oriented in a horizontal orientation to be able to access display rows below row 50 to and including row 80.

Since it will be desirable to be able to change the orientation of the CRT, in the midst of a document, the accessing of the refresh memory to properly position the characters on the face of the CRT when the CRT is either in the horizontal or vertical position requires the selecting of the characters in other than the normal sequence of input, when in the vertical format and thus requires a technique for retrieving characters starting at the lower lefthand corner of the CRT and progressing vertically. The address of the characters in the refresh memory may be expressed by mathematical formula which may then be controlled by logic to properly position each character sequentially on the face of the CRT.

IN THE DRAWING

DETAILED DESCRIPTION OF THE INVENTION

Figure 1A:
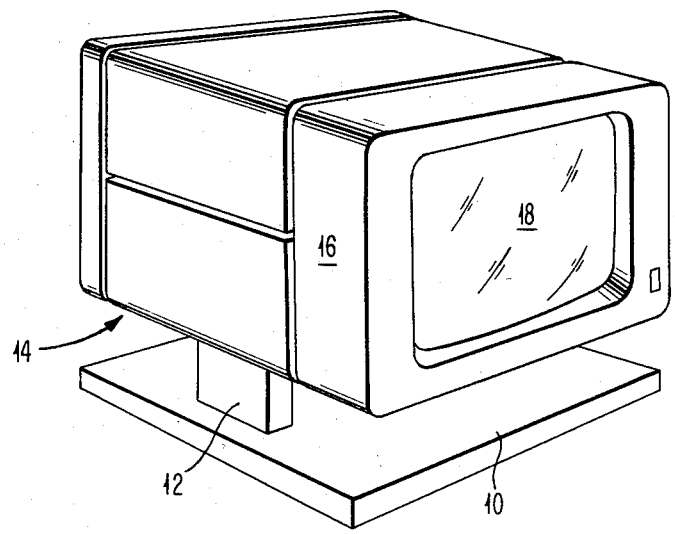
FIGS. 1A and 1B illustrate the terminal display with the CRT in the horizontal and vertical orientations respectively.
Figure 1B:
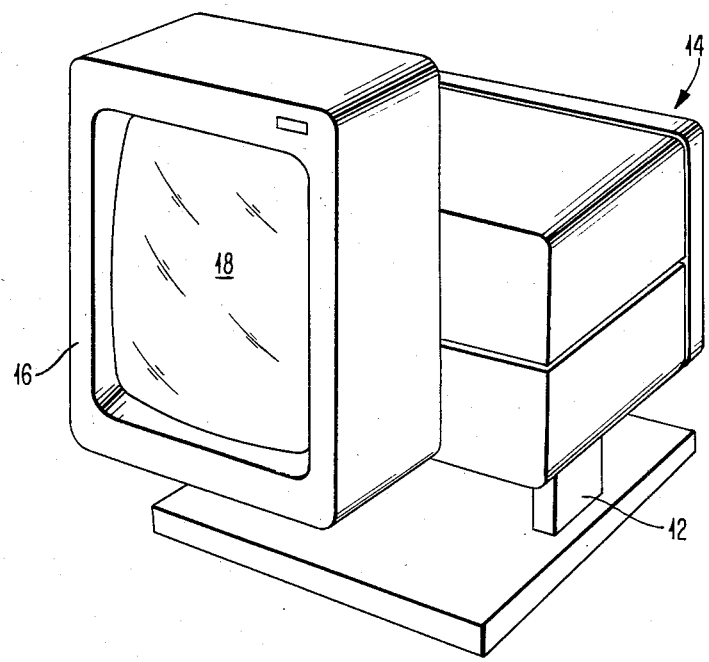

Referring to FIGS. 1A and 1B, the display station is comprised of a base 10 supporting vertical columns 12 which support the rear cover 14. The rear cover 14 in turn supports the bezel 16 which houses the CRT 18. As can be seen by comparing FIGS. 1A and 1B, the bezel 16 and the CRT 18 are rotatable about an axis extending forward from the rear cover 14.

Figure 2:
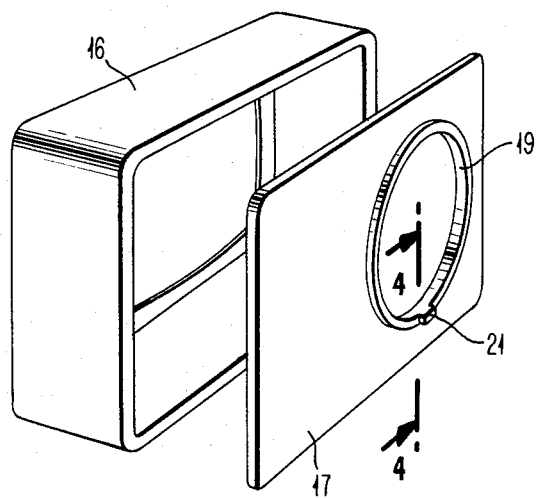
FIG. 2 is an exploded view of the bezel and backing panel of the display.
Figure 3:
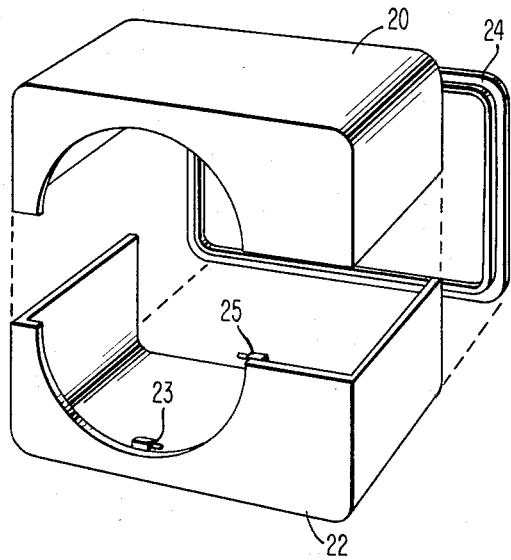
FIG. 3 is an exploded view of the rear enclosure of the display.
Figure 4:
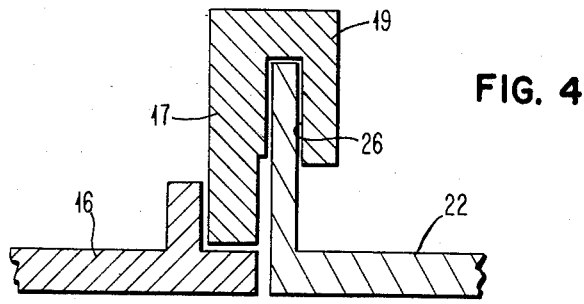
FIG. 4 is a sectional view of the rear enclosure and bezel assembly engaged to rotationally support the bezel.

The bezel enclosure 16 in FIG. 2, mates with the flat panel 17 which has a mounting ring 19 formed therein, allowing access to or protrusion of the yoke of the CRT 18. Ring 19 has a lug 21 protruding to engage with horizontal switch 23 and vertical switch 25 which supply select signals to latch 10 in FIG. 3 for controlling the rotate logic. Switches 23 and 25 may be micro switches or lug 21 may be a magnet and switches 23, 25 may be reed switches as desired.

The rear cover 14 of the display station as illustrated in FIGS. 1A and 1B, comprises the top shell 20 and lower shell 22. The enclosure is completed with the back cover 24 mating with the top cover 20 and lower cover 22. Top cover 20 and lower cover 22 are provided with semicircular openings in the front face thereof to engage with the retaining collar 19 to hold the flat panel 17 and bezel 16. CRT 18 will rotate about the opening in the front of the rear enclosure 14.

The bezel is supported by the flat panel 17 and ring 19. Ring 19 is formed with a channel 26 which can be engaged with the lower and upper rear covers 20 and 22 which will permit the rotation of the bezel 16 and flat panel 18 with respect to the rear cover 14.

Figure 5:
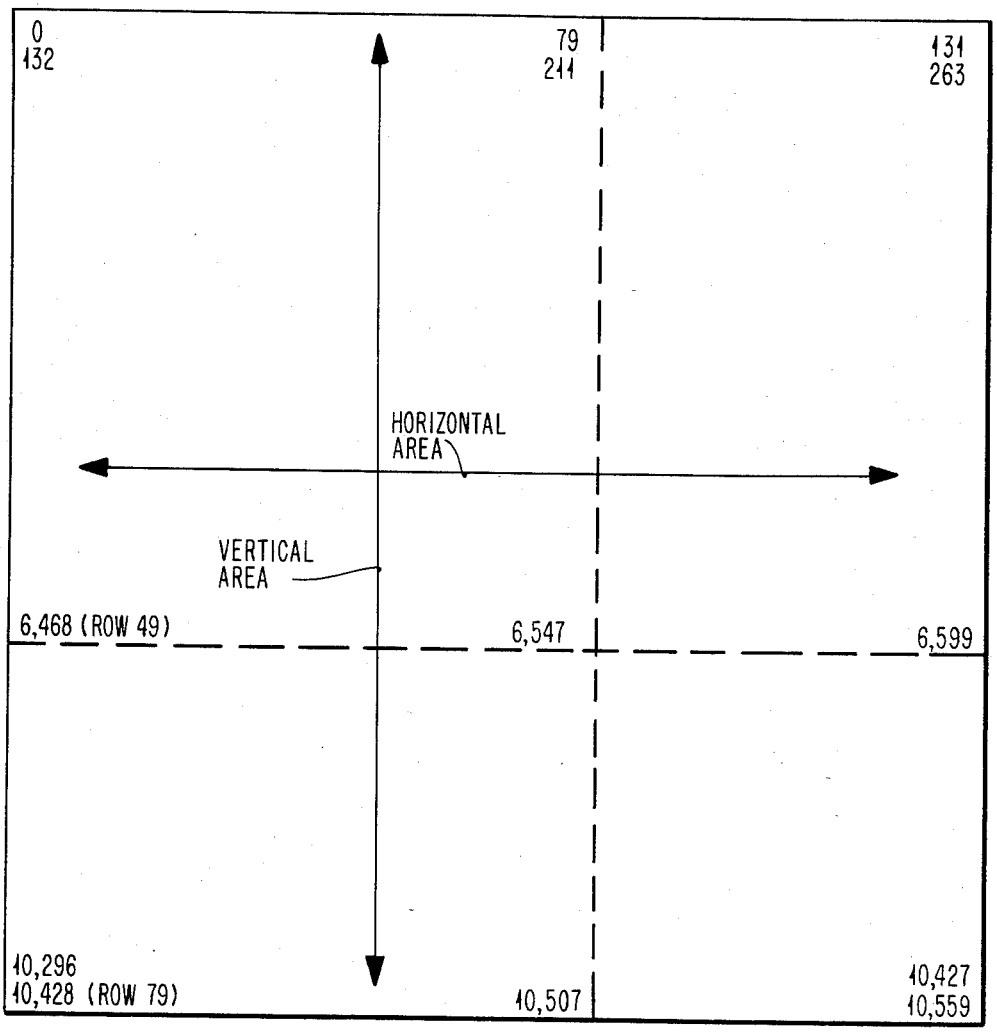
FIG. 5 is a diagram depicting the refresh memory matrix in terms of character storage positions.

With the rotation of the CRT 18 to present a vertical format, the viewable area and the information on the face of the CRT, corresponding to the contents of the refresh memory, can be digramatically depicted as in FIG. 5. FIG. 5 is a rectangular box representing a matrix of storage addresses. Address 0, the first character position in the upper lefthand corner of the video display and digramatically depicted as the upper lefthand corner of the storage matrix, is the first character location. The character locations are then numbered in increasing magnitude on the same line extending to the right through character storage location 131, in the upper righthand corner of the diagram representing the refresh memory. Character 132 then is depicted as stored immediately below by one line, the character number 0. This sequential relation continues until the last row of characters is stored in row number 79 commencing with character location 10,428 and progressing to 10,559 in the lower righthand corner.

The refresh memory has the capability of storing a total of 10,559 characters.

The vertically oriented dashed line, extending from a point immediately to the right of character position 79 and extending downward to a point immediately to the right of character position 10,507 represents the righthand boundary of the data which may be displayed with the CRT 18 in a vertical orientation and with character number 0 residing in the upper lefthand corner of the CRT. The dashed line in a horizontal orientation extending from just below character position 6468, on row 49 and rightward until it passes beneath character position 6599 represents the lower boundary of the viewable data when the CRT 18 is oriented in a horizontal orientation and caused to display the character in character position number 0 in the uppermost lefthand display position on the CRT.

Characters and data stored to the right of the eightieth column of characters when the CRT is in a vertical orientation or below row 49 when the CRT 18 is in a horizontal orientation are accessable by scrolling the display to move the data relative to the CRT face and thereby be able to display the remaining portions of the data outside the windows represented by the dashed lines.

In order to refresh the data displayed upon the screen, in the appropriate sequence as required by the sweep circuitry of the display, the refreshing begins, when the CRT is horizontally oriented, with character position 0 and progressing to character position 131 and upon the completion of the refreshing of the entire first line of characters, commences with character position 132 and continues to character position 263 with this sequence being repeated until character positions on row 49, positions 6468 through 6599 have been totally refreshed. At this point the sequence begins all over again.

Should the data have been scrolled to raise the data displayed to a higher level on the CRT face to access text or information stored below row 49 and through row 79, the refresh sequence will commence at a row displaced down the memory from the first row such that a total of 50 rows of data may be displayed and refreshed. Likewise, the refreshing sequence for the vertical orientation of the CRT, will begin with character position 10,428 progressing to character position 10,296 and continuing until character position 1 is refreshed. At which point character position 10,429, immediately to the right of 10,428, will be refreshed and all characters in a vertical column above it to character position 1. This sequence will continue until the characters in the row limited by character position 10,507 and 79 are refreshed.

Similarly, in the hoirzontal refresh sequence, should the data have been scrolled such that the text and characters stored to the right of the vertical dashed line are to be displayed and refreshed, then the refresh sequence will start at some column to the right of the first column defined by character position 1 and character position 10,428.

In order for the refreshing of the characters to be handled in this manner, it is necessary to load two buffers, alternatively. One buffer is the buffer which contains the characters in the row (or column) being presently refreshed and being fed to the character generator 52 while the second buffer contains characters in the next row (or column) such that it may be loaded while refreshing is being accomplished on the preceding row. In this case, row applies to both rows and columns independent of the orientation of the CRT.

The sequence that the characters are inserted into the row buffer becomes of concern, inasmuch as the sequence in which they must be accessed and presented for character generation is dramatically altered when the CRT is oriented in its vertical orientation.

In order to properly load the row buffers such that the characters are fed to the character generator in proper sequence for painting on the screen and subsequent refresh, it is necessary to address the characters by address location in which they are stored in the refresh memory.

To access the characters in the appropriate order, an addressing sequence must be established. The logic represented in FIG. 7 will in effect control the address for the refresh memory according to the formula:

$$\text{ADDRESS} = (N_{scroll} \times 132) + [N_{char} + (N_{row} \times 132)]$$

Where:

$N_{scroll}$ may have a value from 0 to 30,
$N_{char}$ may have a value from 0 to 131, and,
Where: $N_{row}$ may have a value from 0 to 49.

The value $N_{row}$ represents the rows of characters on the CRT face and the value of 0 to 49 is relative to the face of the CRT and is not in any way to be confused with the rows of character storage positions in the refresh memory. The first row of characters on the face of the CRT is row 0.

The $N_{scroll}$ represents the number of the line of text as stored in the refresh memory which is desired to be placed at the topmost line on the screen of the CRT.

Character positions are designated 0 through 131 to accomplish correlation with the technique of counting where a counter is used and counts from 0 to 131.

In the vertical mode, the address of the character to be refreshed, may be expressed as:

$$\text{Address} = N_{scroll} + [N_{row} + (N_{char} \times 132)]$$

Where:

$N_{scroll}$ may assume a value from 0 to 51;
$N_{row}$ may assume the value of 0 to 79, and,
$N_{char}$ may assume a value from 79 to 0, being counted downward as the beam sweeps across the face of the CRT.

$N_{scroll}$ and $N_{row}$ relate to the rows of characters extending from the bottom edge to the top edge of the CRT when the CRT is vertically oriented as in FIG. 1B. In effect, the characters are arranged in vertical columns but are counted as rows from left to right thereby corresponding to the same rows as in the horizontal address, only with the characters rotated by 90° relative to the CRT face.

The above two equations are implemented in the logic of the system.

Figure 6:
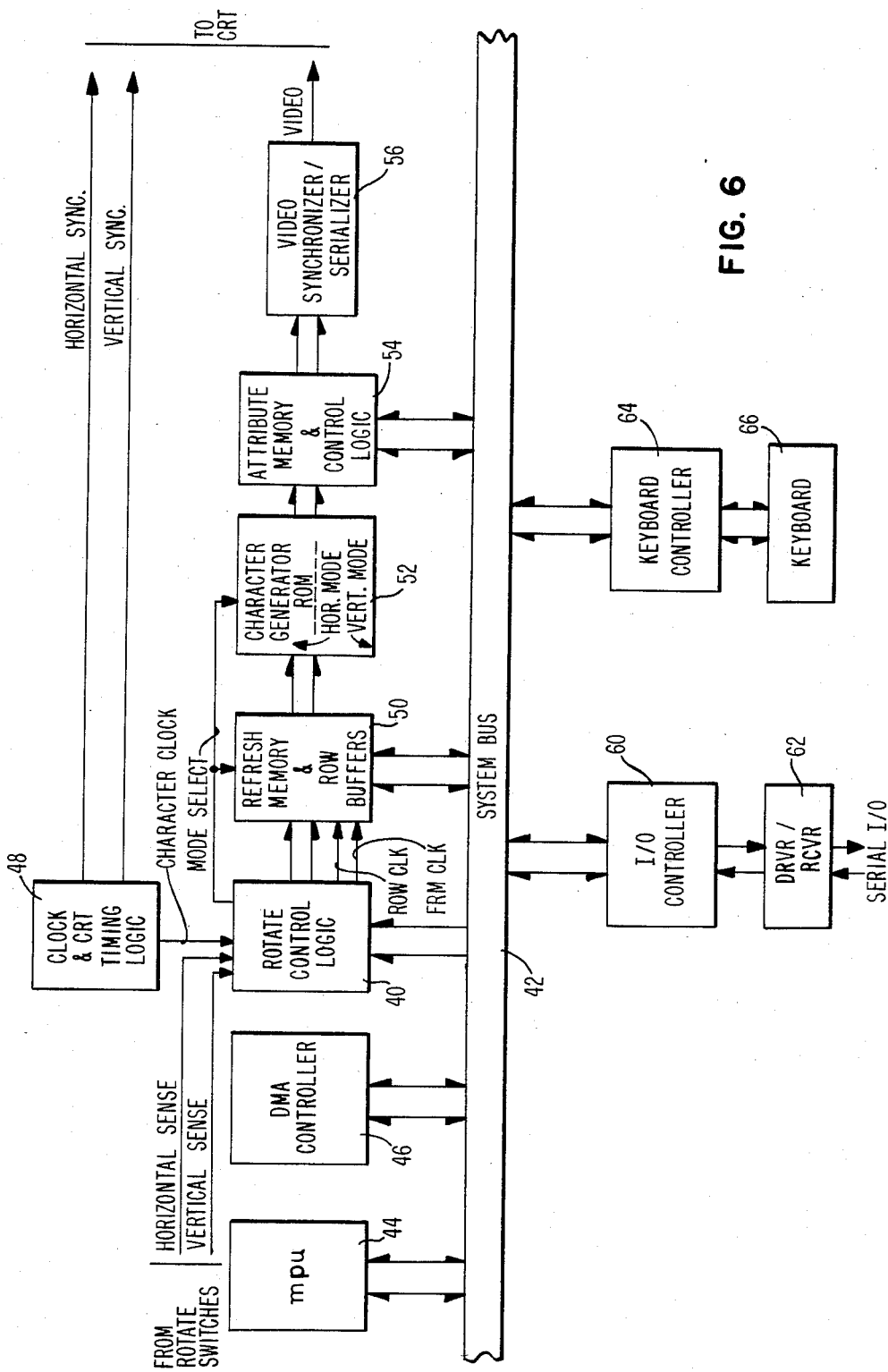
FIG. 6 is a block diagram of the display control logic for the rotatable display.

Referring to FIG. 6, the rotate control logic 40 controls the addressing of the refresh memory. A detailed discussion of the rotate control logic will follow below.

FIG. 6 illustrates the overall system of the display, wherein the system bus 42 provides a communication channel between the other electronic elements of the system. The microprocessor unit 44 controls the overall operation of the display in accordance with its programmed controls and is fully equivalent to the microprocessor units which presently control displays which are only capable of horizontal or vertical format display.

The DMA controller 46 is a direct memory access controller which is capable of performing the same functions as the microprocessor unit 44, with respect to writing or retrieving memory information and causing the refreshing of that information on the face of the CRT, with minimum microprocessor involvement.

In effect, the DMA controller 46 is a partially redundant microprocessor unit which while performing its function permits the microprocessor to perform other unrelated functions without having to attend to the normal electronic housekeeping procedures.

The clock and CRT timing logic 48 perform the necessary logic control of providing timing pulses to the rotate control logic and providing the horizontal and vertical sync signals necessary for operating the CRT.

This portion of the display work station is again conventional.

The refresh memory and row buffers 50 provide the storage capability for refreshing and dispaying text and data on the face of the CRT. The refresh memory is a conventional random access memory having sufficient memory locations to correspond basically to the mapping as illustrated in FIG. 5.

The two row buffers provide for the capability of loading one row buffer with characters in accordance with the addresses defined and set out above and simultaneously shifting the characters from the other row buffer to the character generator.

After the first row buffer is filled under the control of the rotate control logic, its contents is shifted to the character generator 52 while the second row buffer is being loaded. This alternating buffer process continues for the entire screen refresh. The character generator 52 is basically a read only memory which has two segments, one for the horizontal mode and one for the vertical mode. As signals representing particular characters are fed from the refresh row buffer to the character generator read only memory 52, the corresponding data necessary to generate the dot pattern on the face of the CRT to create the character is then read out to the attribute memory and control logic 54.

The attribute memory and control logic act to create particular attributes of the characters on the face of the CRT, such as blinking, underscoring, or highlighting or reversing the characters such that it appears as a unlighted character on a lighted background.

All of these techniques are clearly conventional and the techniques for accomplishing them have existed in the art for some time.

From the attribute memory and control logic 54, the signals are then sent to the video synchronizer and serializer 56 and then to the CRT for actual displaying of the dots or pels on the face of the CRT.

Also connected to the system bus, for purposes of completeness of the system are, the I/O controller 60 with its driver receiver 62 which in turn controls the receipt and sending of data, and a keyboard controller 64 connected to a keyboard 66 for manual data input.

Figure 7:
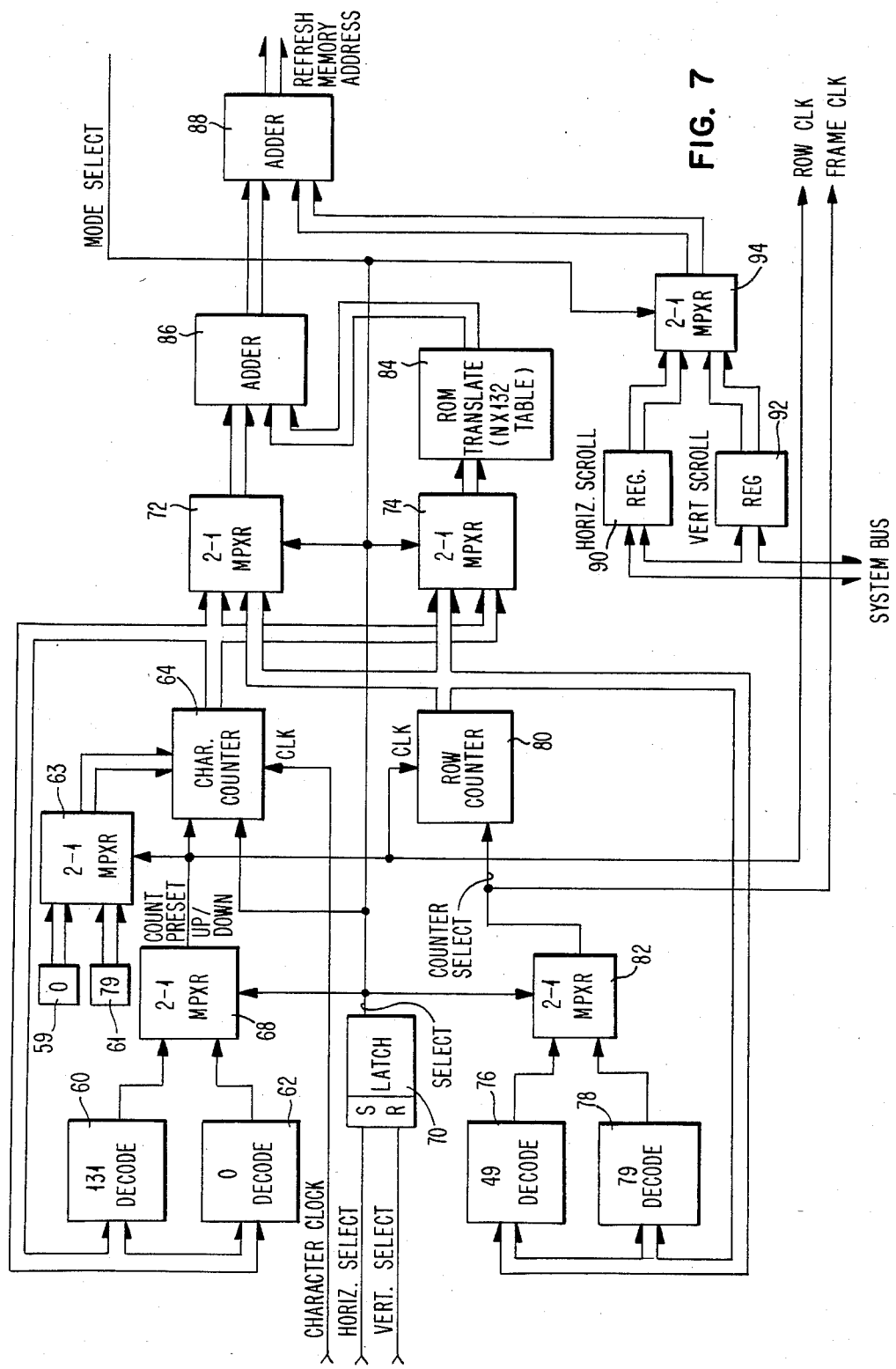
FIG. 7 is a block diagram of the rotate control logic of FIG. 6.

The rotate control logic 40 is represented in more detail in FIG. 7. The rotate control logic 40 comprises a 131 decode 60 and a "0" decode 62. These two decoders receive signals from the character counter 64. The character counter is incremented in its selected direction by the character clock signal 66. When the 131 decode 60 or the "0" decode 62 reach their destination count of 131 or 9 respectively, an output signal is created and sent to the two to one multiplexer 68. Depending upon which signal has been received by the select latch 70, the two to one multiplexer will permit passage of the output signal from one of the decoders 60, 62 on the counter reset line to the character counter 64 effectively presetting the character counter 64. At the same time that the character counter 64 is outputting signals which are fed to the decoders 60, 62, the same signal will go to the two to one multiplexers 72 and 74. The two to one multiplexer 63 acts under latch 70 control to load a present value of 0 or 79 into the character counter 64. Inputs 59, 61 provide a fixed output value without any imput.

Two additional decoders a 49 decode 76 and an 79 decode 78 are capable of receiving signals from the row counter 80. The row counter may be incremented by a signal from the counter preset line between multiplexer 68 and character counter 64 indicating that the character counter is to begin counting on the next line. The same signal will also be outputted on the line labeled row clock to the refresh memory and row buffers to cause the movement of the characters from the loading buffer into the row buffer utilized to feed signals to the character generator ROM 52.

Multiplexer 82 is the equivalent of multiplexer 68 and selects which of the signals which are outputted from the decoders 76, 78, which are available will be passed on the counter reset line to the row counter 80. The counter reset line signal may also be passed on the frame clock counter to the refresh memory and row buffer 50.

Character counter 64 is connected to multiplexer 72 and multiplexer 74 while row counter 80 is connected to multiplexer 72 and multiplexer 74. The select line emanating from latch 70 will control the two to one multiplexers 72, 74 such that one of the multiplexers will pass the character counter signal while the other multiplexer will pass the row counter signal. The output of multiplexer 74 is passed through a read only memory translate table 84, which then passes the output thereof to adder 86. The output from multiplexor 72 is combined by adder 86 with the output from read only memory translate 84. The output of the adder is then passed to a subsequent adder 88.

The system bus as illustrated in FIG. 6, is connected into the rotate control logic such that it interfaces directly with the horizontal scroll register 90 and the vertical scroll register 92. Thus, any commands to scroll the display, will come from the microprocessor unit 44 to the registers 90, 92 and the output of those registers is selected depending upon the condition of latch 70 to pass one of the signals to the multiplexor 94, to the adder 88 where that output is combined with the output of adder 86 to provide the refresh memory address.

The character clock signal is generated and provided to the rotate control logic 40 by the clock timing logic 48.

The control of latch 70 is through signals emanating from a horizontal and vertical sense switching arrangement located on the console and housing of the terminal such that the rotation of the flat panel 18 with respect to the lower and upper covers 22, 20 causes a signal to be sent to the latch 70. The condition of the latch 70 in turn then controls the multiplexers 68, 82, 72, 74, 63 and 94. Latch 70 also provides a select mode signal to the refresh row buffers to set proper buffer length and to the character generator 52 to select the appropriate portion.

By rotating the bezel 16 and flat panel 18 together with the CRT 18, the switches will function to cause the switching of control of the rotate control logic thereby altering the effective addressing sequence of the characters retrieved from the refresh memory 50.

I claim:

1. A display for presenting text in a first format having a greater number of text lines but a smaller number of characters per line, and a second format having a smaller number of lines but a greater number of characters per line, comprising:
    (a) rectangular display means having a longer dimension and a shorter dimension;
    (b) scanning means fixedly mounted to said display means for producing a set of scan lines always along one of said dimensions;
    (c) switch means for selecting between said first and second formats;
    (d) buffer means for storing characters to be shown on said display means in both said first and said second format, the number of said characters being at least the greater number of said text lines times the greater number of said characters per line; and
    (e) addressing means for selecting characters from said buffer means, and for transferring said characters to said display means, in either of two different sequences in response to said switch means.

2. The display of claim 1 wherein said display means is rotatably positionable in at least two orientations, one having said longer dimension in a horizontal orientation and one having said longer dimension in a vertical orientation.

3. The display of claim 2 wherein said switch means is responsive to the orientation of said display means.

4. The display of claim 1 wherein said addressing means selects characters from said buffer means in a sequence defined by the equation:

$$ADDRESS = N_{scroll} \times 132 + (N_{char} + (N_{row} \times 132))$$

Where:
$N_{scroll}$ has a value from 0 to 30,
$N_{char}$ has a value from 0 to 131, and,
$N_{row}$ has a value from 0 to 49 when
said longer dimension is horizontally oriented.

5. The display of claim 1 wherein said addressing means selects characters from said buffer means in a sequence defined by the equation:

$$ADDRESS = N_{scroll} + (N_{row} + (N_{char} \times 132))$$

Where:
$N_{scroll}$ assumes a value from 0 to 51;
$N_{row}$ assumes the value of 0 to 79, and,
$N_{char}$ assumes a value from 79 to 0, being counted downward as the beam sweeps across the face of the CRT
when said longer dimension is vertically oriented.

* * * * *